United States Patent [19]  
Fujii

[11] 4,216,977  
[45] Aug. 12, 1980

[54] HYDROPNEUMATIC SUSPENSION SYSTEM FOR VEHICLE WITH VALVE MEANS FOR SELECTIVELY KEEPING HYDRAULIC FLUID WITHIN GAS CUSHION

[75] Inventor: Masayuki Fujii, Yokohama, Japan

[73] Assignee: Nissan Motor Company, Limited, Yokohama, Japan

[21] Appl. No.: 950,150

[22] Filed: Oct. 10, 1978

[30] Foreign Application Priority Data

Nov. 7, 1977 [JP] Japan .................. 52-132436

[51] Int. Cl.$^2$ ............................................. B60G 17/06
[52] U.S. Cl. ..................................... 280/707; 60/403; 280/714
[58] Field of Search .............. 280/702, 704, 708, 707, 280/714, 710; 60/403, 416

[56] References Cited

U.S. PATENT DOCUMENTS 3,840,245  10/1974  Aikawa et al. .................. 280/708
3,873,124  3/1975   Ito et al. ......................... 280/708
4,162,091  7/1979   Sano ............................... 280/702

FOREIGN PATENT DOCUMENTS 2736026  2/1978  Fed. Rep. of Germany ........... 280/707

Primary Examiner—John J. Love  
Assistant Examiner—Ross Weaver  
Attorney, Agent, or Firm—Schwartz, Jeffery, Schwaab, Mack, Blumenthal & Koch

[57] ABSTRACT

Switching arrangements, mechanical and electrical, for lowering or raising the vehicle body. They include electrically controlled discharge means for discharging hydraulic fluid from hydropneumatic suspension units, one for each wheel unit, a switch and electrically controlled valve means fluidly disposed in a fluid passage between a power chamber of an adjustable strut and a hydraulic fluid chamber of a gas cushion connected to the strut. Upon closing of the switch the valve will close the fluid passage to keep hydraulic fluid within the gas cushion and the discharge means will commence to discharge hydraulic fluid from the power chamber.

3 Claims, 2 Drawing Figures

HYDROPNEUMATIC SUSPENSION SYSTEM FOR VEHICLE WITH VALVE MEANS FOR SELECTIVELY KEEPING HYDRAULIC FLUID WITHIN GAS CUSHION

BACKGROUND OF THE INVENTION

The present invention relates to a hydropneumatic suspension system for a vehicle.

A vehicular hydropneumatic suspension system is known in which auto-levelling valves are built in hydropneumatic suspension units, respectively, one for each of wheel units of the vehicle, for supplying hydraulic fluid to, or discharging from the suspension units so as to regulate the level of the vehicle body. Each of the auto-levelling valves will supply hydraulic fluid to the suspension unit to which it is connected if the vehicle body lowers due to an increase in load or will discharge hydraulic fluid from the suspension unit if the vehicle body rises due to a reduction in load so as to regulate the level of the vehicle body.

With this known hydropneumatic suspension system it is possible to lower the vehicle body from a certain level to a level low enough to facilitate ingress into or engress from the vehicle by discharging hydraulic fluid from the suspension units.

The problem encountered in this known hydropneumatic suspension system is in sluggish response of the system to the operator's demand to lower the vehicle body from the certain level. This attributes to the fact that during the discharging operation hydraulic fluid is discharged not only from a power chamber within a strut of each of the suspension units but also from a gas cushion connected to the cylinder, in particular, from a liquid chamber, separated from a gas chamber by a flexible membrane, connected to the power chamber. Since the amount of hydraulic fluid accummulated within each gas cushion for normal operation of the gas cushion is considerably large, it takes a long time for discharging hydraulic fluid from the suspension units until the vehicle body lowers to the desired level.

SUMMARY OF THE INVENTION

It is therefore an object of the present invention to provide a hydropneumatic suspension system for a vehicle free from the above mentioned problem which provides fast response to the operator's demand to lower the vehicle body.

Another object of the present invention is to provide a hydropneumatic suspension system which provides fast response to the operator's demand to raise the vehicle body.

A hydropneumatic suspension system for a vehicle according to the present invention employs a hydropneumatic suspension unit having an adjustable strut and a gas cushion having a hydraulic fluid chamber separated from a gas chamber by a flexible membrane. The strut includes a power chamber which effects extension or retraction thereof, and the hydraulic fluid chamber of the gas cushion is connected to the power chamber through a passage. The system also includes electrically controlled supply device for supplying hydraulic fluid to a first port of the suspension unit, electrically controlled discharge device for discharging hydraulic fluid from a second port of the suspension unit, and auto-levelling valve for regulating the level of the vehicle body by selectively supplying hydraulic fluid from the first port to, or discharging hydraulic fluid to the second port from the power chamber. Second electrically controlled discharge device is provided for discharging hydraulic fluid from the power chamber to lower the vehicle body from a certain regulated level. Series connected drive switch and roll sensitive switch is connected to the first electrically controlled supply means and the electrically controlled discharge device and is operated to prevent the first supply device from supplying hydraulic fluid to the first port and to prevent the discharge device from discharging hydraulic fluid from the second port. Third switch is connected to the second discharge device and is operative to permit it to discharge hydraulic fluid from the power chamber. Electrically controlled valve is fluidly disposed in the passage interconnecting the gas cushion and the power chamber. This valve is connected to the third switch such that when the second discharge device discharges hydraulic fluid from the power chamber it will close the passage thereby to prevent hydraulic fluid from being discharged from the gas cushion.

The system also includes second supply device for supplying hydraulic fluid to the power chamber to raise the vehicle body and fourth switch connected to the second supply device and operative to permit it to supply hydraulic fluid to the power chamber, wherein the fourth switch is connected also to the electrically controlled valve such that when the second supply device supplies hydraulic fluid to the power chamber, the valve will close the passage thereby to prevent hydraulic fluid from entering into the gas cushion.

Preferably, the electrical switching arrangements include delay means whereby upon closing of the third switch means the electrically controlled valve means will be closed before the second discharge means commence to discharge hydraulic fluid from the power chamber. Another delay means may be provided to permit, upon closing of the fourth switch means, the electrically controlled valve to close the passage before the second supply device commences to supply hydraulic fluid to the power chamber.

DESCRIPTION OF THE PREFERRED EMBODIMENT

Figure 1:
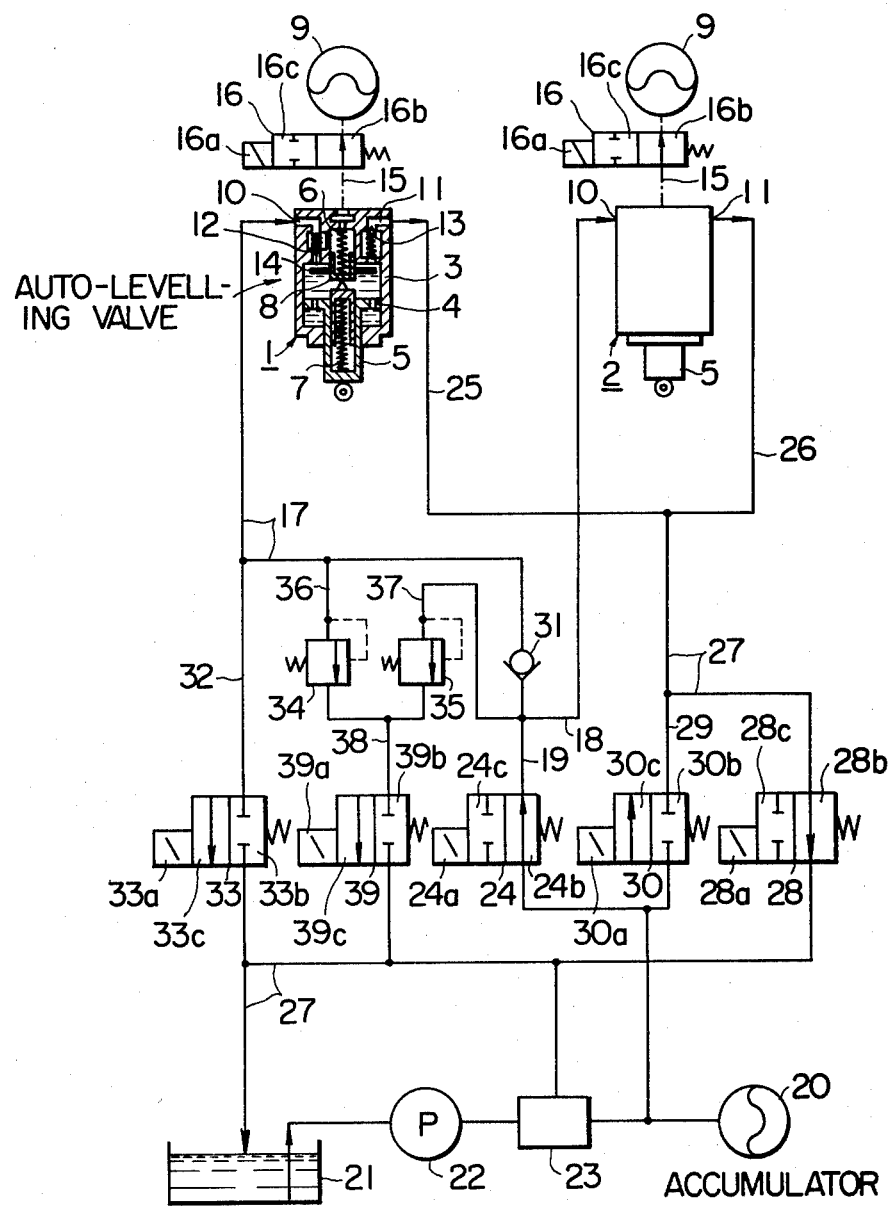
FIG. 1 is a schematic diagram of a hydraulic control circuit of hydropneumatic suspension system for a vehicle.

Referring to FIG. 1, the reference numeral 1 denotes a hydropneumatic suspension unit for each front wheel unit, while, the reference numeral 2 denotes a hydropneumatic suspension unit for each rear wheel unit. Two of such hydropneumatic suspension unit 1 are operatively disposed between a suspension member (not shown) for a front wheel on the left hand side and a vehicle body and between a suspension member for a front wheel on the right hand side and the vehicle body, respectively, while, two of such hydropneumatic suspension unit 2 are operatively disposed between a suspension member for a rear wheel on the left hand side and the vehicle body and between a suspension member for a rear wheel on the right side, respectively. Since a hydraulic control circuit interconnecting the suspension unit for the front wheel on the left hand side and the suspension unit for the rear wheel on the same side is substantially the same as a hydraulic control circuit interconnecting the suspension unit for the front wheel on the right hand side and the rear wheel on the same side, only one of the hydraulic control circuits is illustrated in FIG. 1.

Each of the suspension units 1 and 2 includes an adjustable strut which employs a cylinder 3, a piston 14 slidably disposed within the cylinder 3, and an integral piston rod 5 of the piston 4 extending outwardly from a lower end of the cylinder 3. Built within each of the suspension units 1 and 2 is an auto-levelling valve which includes a spring 6 within a chamber, a piston 8 urged by the spring toward the piston 4 into abutting contact with a piston slidably disposed in the piston rod 5 and urged by a spring 7 in a direction to project from the piston 4. The chamber where the spring 6 is disposed communicates with a hydraulic fluid chamber of the corresponding gas cushion 9 separated from a gas chamber thereof by a flexible membrane. The cylinder 3 has a fluid-in port or supply port 10 and a fluid-out port or discharge port 11. The auto-levelling includes two poppet valves 12 and 13 which are actuable by the piston 8 which serves as an actuator. The poppet valve 12 normally closes fluid communication between the supply port 10 and a power chamber inside the cylinder 3 but opens the fluid communication as the piston 8 is moved upwardly from the illustrated position. The other poppet valve 13 normally closes fluid communication between the discharge port 11 and the power chamber inside the cylinder 3 but opens the fluid communication as the piston 8 is moved downwardly from the illustrated position. A valve actuator plate 14 is operatively connected to the poppet valves 12 and 13 with a suitable play and fixed to the piston 8.

The hydropneumatic suspension unit employing an auto-levelling valve is well known in the art. The detailed construction and operation of this hydropneumatic suspension unit may be understood if reference is made to U.S. Pat. No. 3,807,753 filed Dec. 26, 1972 by Ito et al., patented Apr. 30, 1974 and assined to Nissan Motor Company.

Each hydropneumatic suspension unit is arranged below the vehicle body with the cylinder 3 thereof mounted to the vehicle body and with the piston rod 5 thereof mounted to the suspension member for the corresponding wheel.

A normally closed solenoid operable valve 16 is fluidly disposed in a fluid passage 15 establishing fluid communication between the cylinder 3 and the gas cushion 9 of each hydropneumatic suspension unit 1 or 2. The solenoid valve 16 has a solenoid 16a and has a first position 16b when the solenoid 16a is not energized in which fluid communication through the passage 15 in a direction toward the gas cushion 9 from the cylinder 3 only is permitted. When the solenoid 16a is energized, the solenoid valve 16 will change its position from the first position 16b to a second position in which fluid communication through the passage 15 is cut off or prevented.

The supply ports 10 of the suspension units 1 and 2 are connected to the accumulator 20 via respective conduits 17 and 18 and a common conduit 19. The accumulator 20 cooperates with an oil reservoir 21, a pump 22 and an unload valve 23 to form a source of hydraulic pressure. With the pump 22, the hydraulic fluid within the reservoir 21 is displaced into the accumulator 20 under the control of the unload valve 23. Under the control of the unload valve 23, the pressure within the accumulator 20 will be maintained at a predetermined level. A normally open solenoid valve 24 is fluidly disposed in a supply conduit 19. The valve 19 will take a position 24b in which fluid can flow through the supply conduit 19 toward a direction from the accumulator 20 toward the inlet ports 10 through the supply passage 19 when a solenoid 24a thereof is not energized. When the solenoid 24a is energized, the valve 24 will take a position 24c in which fluid communication through the conduit 19 is closed or blocked.

The discharge ports 11 of the suspension units 1 and 2 are connected to the oil reservoir via respective drain conduits 25 and 26 and via a common drain conduit 27. A normally open solenoid operable valve 28 is fluidly disposed in the common drain conduit 27. The valve 28 will take a position 28b in which fluid flow in a direction toward the reservoir 21 is permitted through the drain conduit 27 when a solenoid 28a is not energized. When the solenoid 28a is energized, the valve 28 will take another position 28c in which fluid communication through the drain conduit 27 is blocked or closed.

The discharge ports 11 of the suspension units 1 and 2 are connected to the accumulator 20 via a common conduit 29. In this common conduit 29, a normally closed solenoid valve 30 is fluidly disposed. The valve 30 will take a position 30b in which fluid communication through the conduit 29 is blocked or closed when a solenoid 30a thereof is not energized. When the solenoid 30a is energized, the valve 30 will take another position in which fluid flow through the conduit 29 in a direction from the accumulator 20 toward the discharge ports 11 is permitted.

A check valve 31 is fluidly disposed in the supply conduit 17 to prevent fluid flow from the supply port 10 of the suspension unit 1 toward the supply conduit 18. A conduit 32 at one end thereof is connected to the conduit 17 at a junction between the check valve 31 and the supply port 10 of the suspension unit 1 and at the other end is connected to the reservoir 21. In this conduit 32 a normally closed solenoid valve 33 is fluidly disposed. The valve 33 will take a position 33b in which the conduit 32 is closed when a solenoid 33a thereof is not energized. When the solenoid 33a is energized the valve 33 will take another position 33a in which fluid flow through the conduit 32 from the conduit 17 toward the reservoir 21 is prevented or blocked.

A conduit 36 having disposed therein a pressure maintaining valve 34, in the form of an adjustable check valve, is connected to the supply port 10 of the suspension unit 1 via the conduit 17, while, another conduit 37 having disposed therein a similar pressure maintaining valve 35 is connected to the supply port 10 of the suspension unit 2 via the conduit 18. The conduits 36 and 37 are connected to the drain conduit 27 via a common conduit 38. In this common conduit 38, a normally closed solenoid valve 39 is fluidly disposed. The valve 39 will take a position 39b in which fluid communication through the conduit 38 is blocked or prevented when a solenoid 39a is not energized. When the solenoid 39a is energized, the valve 39 will take another position 39c in which fluid flow through the conduit 38 in a direction toward the reservoir 21 only is permitted.

Figure 2:
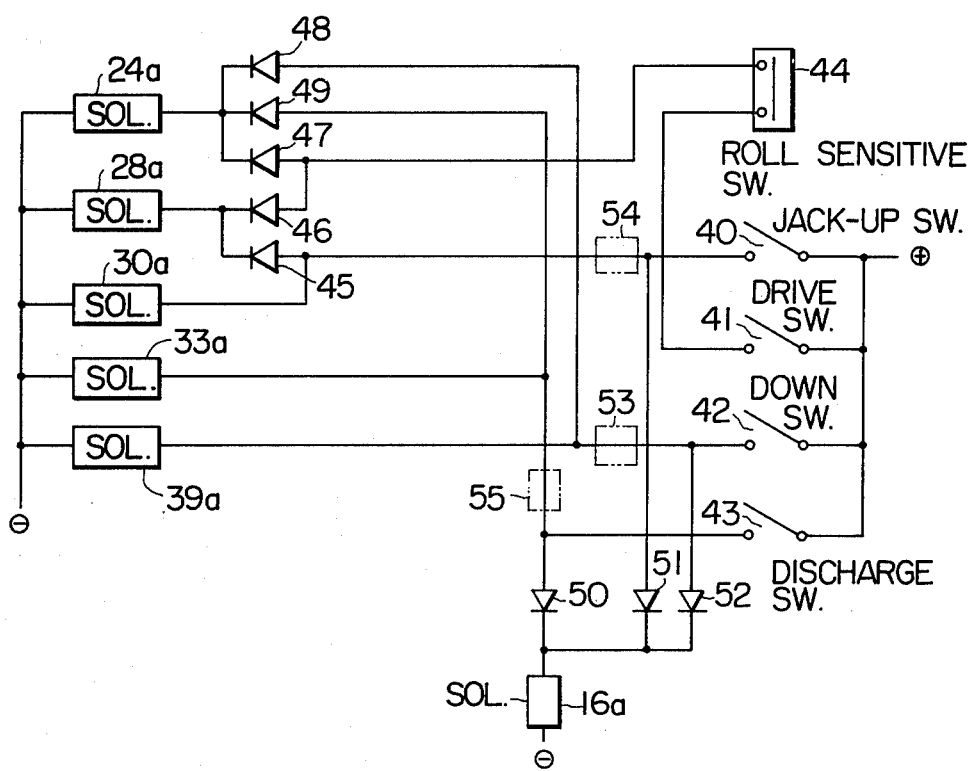
FIG. 2 is a wiring diagram of electrical switching arrangements including solenoids of electrically controlled used in the hydraulic control circuit.

Referring to FIG. 2, the reference numeral 40 denotes a jack-up switch, the reference numeral 41 a drive switch, the reference numeral 42 a down switch and the reference numeral 43 a discharge switch. These switches should be located or arranged with a passenger or driver compartment at a location easily accessible by a driver. The reference numeral 44 denotes a roll sensor or roll sensitive switch which is responsive to a predetermined roll on the vehicle body. The switch 40 is connected to the solenoid 28a via a diode 45, and is directly connected to the solenoid 30a. The switch 41 is connected to the solenoid 28a via the roll sensor 44 and a diode 47. The switch 42 is connected to the solenoid 24a via a diode 48, and is directly connected to the solenoid 39a. The switch 43 is connected to the solenoid 24a via a diode 49 and is directly connected to the solenoid 33a. The switches 40, 42 and 43 are connected to the solenoid 16a via diodes 50, 51 and 52, respectively.

The operation of the hydropneumatic suspension system according to the invention will be hereinafter described.

The drive switch 41 should be closed and the other switches 40, 42 and 43 should be left open under driving condition of the vehicle. Since the roll sensor 44 is electrically connected in series with the driving switch 41, closing the driving switch 41 will not result in energization of the solenoid 24a and 28a as long as the roll sensor switch 44 is open when the vehicle is running generally straight. Therefore, under driving condition the solenoid operable valves 24 and 28 take the illustrated positions 28b and 30b thereof, respectively, as long as the vehicle is running generally straight, thereby to open the supply conduit 19 and to open the discharge conduit 27. The other solenoid 30a, 33a and 39a are not energized under driving condition of the vehicle, causing the corresponding solenoid valves 30, 33 and 39 to close the conduits 29, 32 and 38, respectively.

Therefore, the fluid within the accumulator 20 will be supplied through the valve 24 and the check valve 31 to the supply port 10 of the suspension unit 1 and will be supplied through the valve 24 toward the supply port 10 of the suspension unit 2, while, the discharge ports 11 of the suspension units 1 and 2 will be permitted to communicate with the oil reservoir 2 through the valve 28.

When the vehicle body is at a desired level the poppet valves 12 and 13 of each of the suspension units 1 and 2 are closed so as to prevent the hydraulic fluid from entering into the suspension units and from discharging from them. When the vehicle body falls below the desired level such as due to an increase in load carried by the vehicle, the pistons 8 move upwardly from the position illustrated in FIG. 1 to open the poppet valves 12 to permit the supply of fluid from the supply ports 10 to the power chambers inside the suspension units 1 and 2, thereby to raise the vehicle body up to the desired level. When the vehicle body raises above the desired level such as due to a reduction in load carried by the vehicle, the pistons 8 move downwardly from the position illustrated in FIG. 1 to open the other poppet valves 13 to permit the discharge of fluid from the discharge ports 11, thereby to lower the vehicle body to the desired level. When the vehicle body returns to the desired level, the poppet valves 12 and 13 will take the closed positions thereof, respectively, as shown in FIG. 1, thereby to prevent the admission or discharge of fluid to and from the suspension units 1 and 2. Thus, the vehicle body will be maintained at the desired level regardless of the variation in load carried by the vehicle.

When the roll of the vehicle body exceeds a predetermined degree such as when the vehicle makes a turn or run through a corner, the roll sensor 44 will be closed, thereby to energize the solenoids 24a and 28a. The energization of the solenoid 24a and 28a will cause the corresponding solenoid valves 24 and 28 to close the hydraulic fluid conduits 19 and 27, respectively. Therefore, even if the suspension units 1 and 2 are contracted or extended resulting from a lateral acceleration when the vehicle makes a turn or runs through a corner, the supply of hydraulic fluid to, or the discharge of hydraulic fluid from these suspension units will not take place.

When it is necessary to lower the vehicle body from the desired level down to a certain level low enough to facilitate ingress to, or egress to the vehicle, the down switch 42 should be closed. Under this condition in which the vehicle is at a standstill, the drive switch 41 may be closed if desired because the roll sensor 44 is closed to cancel the influence of the drive switch 41 on the solenoids 24a and 28a. Closing the down switch 42 will energize the solenoids 24a and 39a, thus causing the solenoid valves 24 and 39 to take positions 24a and 39c thereof, respectively. As a result, the hydraulic conduit 19 is closed, while, the hydraulic conduit 38 is opened. Since the solenoid valve 24 block or close fluid communication through the hydraulic conduit 19 extending from the accumulator 20, the hydraulic fluid within the accumulator 20 will be prevented from being supplied to the supply ports 10. Since the solenoid valve 39 opens the hydraulic conduit 38, the port 10 of the suspension unit 1 communicates with the reservoir 21 via the conduit 17, conduit 36, pressure maintaining valve 34, conduit 38, solenoid valve 39 and conduit 27, while, the port 10 of the suspension unit 2 communicates with the reservoir 21 via the conduit 18, conduit 37, pressure maintaining valve 35, conduit 38, solenoid operable valve 39 and conduit 27. When, in this manner, the port 10 communicates with the reservoir 21, the pressure at the port 10 will reduce to permit the pressure within the cylinder 3 to urge the poppet valve 12 toward an open position. Opening of the poppet valve 12 will permit the hydraulic fluid within the cylinder 3 to be discharged from the port 10 toward the reservoir 21. The pressure within the cylinder 3 of the suspension unit 1 will be lowered till a predetermined level set by the pressure maintaining valve 34, while, the pressure within the cylinder 3 of the suspension unit 2 will be lowered to a predetermined level set by the pressure maintaining valve 35. These pressure maintaining valves 34 and 35 will prevent discharge of hydraulic fluid from the suspension units 1 and 2 when the pressures within the cylinders 3 of the suspension units 1 and 2 have lowered to the predetermined pressure level. Since, as described above, the pressure within the suspension units 1 and 2 will be lowered and then maintained at the predetermined pressure set by the pressure maintaining valves 34 and 35 after closing of the down switch 42, the vehicle body will be lowered to a level corresponding to the predetermined pressure within the cylinders 3 of the suspension units 1 and 2.

If the predetermined pressure set by the pressure maintaining valve 34 is to be set higher than the predetermined pressure set by the pressure maintaining valve 35, the check valve 31 will prevent flow of hydraulic fluid from the high pressure side toward the low pressure side, thus preventing the pressure within the suspension unit 1 from lowering till the pressure level within the suspension unit 2. In the case of a passenger car having a front engine compartment, the pressure within the front suspension units is set higher than the pressure within the rear suspensions units to maintaining the vehicle body substantially parallel to the rod surface at all times.

When it is necessary to raise the vehicle body from the desired level for changing a tire, the jack-up switch 40 will be closed to energize the solenoids 28a and 30a, thus causing the solenoid valves 28 and 30 to open the drain conduit 27 and open the hydraulic conduit 29, respectively. Then, the hydraulic fluid within the accumulator 21 will be supplied to the discharge ports 11 of the suspension units 1 and 2 via the solenoid valve 30, conduits 29, 27, 26 and 25, thus urging the valves 13 toward open positions thereof, respectively, thereby to permit the hydraulic fluid to enter into the suspension units 1 and 2 so as to increase the pressures therein. As a result, the suspension units 1 and 2 will be elongated in accordance with an increase in pressures therein toward a maximum length so as to elevate the vehicle body fully. When the vehicle body has been elevated till a maximum elevated level, a stand or block is inserted below the vehicle body and then the jack-up switch 40 should be opened and the discharge switch 43 should be closed. As a result, the solenoids 24a and 33a will be energized, thus causing the solenoid operable valve 24 to close or block the hydraulic conduit 19 and causing the solenoid operable valve 33 to open the hydraulic conduit 32. Consequently, the supply ports 10 of the suspension units 1 and 2 communicate with the reservoir 21 via the drain conduit 27 and thus the poppet valves 12 are opened due to internal pressures within the suspension units 1 and 2, thus permitting hydraulic fluid to be discharged from the suspension units 1 and 2 toward the reservoir 21 via the solenoid operable valve 33. As a result the suspension units are contracted so that the wheel or wheels adjacent the stand will be elevated from the road surface.

During closing operation of each of the switches 40, 42 and 43, the solenoid 16a will be energized thereby to cause the solenoid valve 16 to close the passage 15 so as to prevent fluid communication between the cylinder 3 and the gas cushion 9. Since the hydraulic fluid accumulated or contained in the gas cushion 9 will not be discharged or added during the operation of the above switches 40, 42 and 43, the time required for the operation after closing of the switches 40, 42 and 42 will be shortened by an amount corresponding to admission or discharge of hydraulic fluid to or from the gas cushion 9, which otherwise would be necessary. Therefore, it will be appreciated that the time required for elevating the vehicle body or lowering the vehicle body has been shortened with the provision of the solenoid operable valve 16 fluidly disposed in the passage 15 between the cylinder 3 and the gas cushion 9. Furthermore, it will be appreciated that a power required for elevating the vehicle body or lowering the vehicle body can be saved because of the provision of the solenoid operable valve 16.

The above mentioned effect becomes marked if the solenoid 16a is energized before the other solenoids to be energized when each of the switches 40, 42 and 43 are closed. For this purpose, it is preferable to provide a delay timer 53 is provided the switche 42. If necessary, for the switch 40 a delay timer 54 may be provided (see FIG. 2) and for the switch 43 a delay timer 55 may be provided (see FIG. 2).

What is claimed is:

1. A hydropneumatic suspension system for a vehicle having a body and front and rear wheel units, comprising:
    at least one hydropneumatic suspension unit for each wheel unit, said suspension unit including an adjustable strut having a power chamber therein and a gas cushion having a hydraulic fluid chamber connected to said power chamber through a fluid passage, said suspension unit having a first port and a second port;
    first electrically controlled supply means for supplying fluid to said first port of said suspension unit;
    first electrically controlled discharge means for discharging fluid from said second port of said suspension unit;
    valve means associated with said suspension unit for controlling fluid connection between said first port thereof and said power chamber therein and fluid connection between said second port thereof and said power chamber therein;
    actuating means responsive to relative movement between the body and said wheel unit for actuating said valve means so as to regulate the level of the body;
    second electrically controlled discharge means for discharging fluid from said power chamber of said suspension unit to lower the body;
    series connected first and second switch means connected to said first electrically controlled supply means and said first electrically controlled discharge means and operative to prevent said first electrically controlled supply means from supplying fluid to said first port of said suspension unit and to prevent said first electrically controlled discharge means from discharging fluid from said second port of said suspension unit;
    a third switch means connected to said second electrically controlled discharge means and operative to permit said second electrically controlled discharge means to discharge fluid from said power chamber of said suspension unit to lower the body; and wherein the improvement being in that
    an electrically controlled valve means is fluidly disposed in said fluid passage for selectively closing and opening said fluid passage, and is connected to said third switch means such that when said second electrically controlled discharge means discharges fluid from said power chamber of said suspension unit, said electrically controlled valve means will close said fluid passage.

2. A hydropneumatic suspension system as claimed in claim 1, further comprising:
    second electrically controlled supply means for supplying fluid to said power chamber of said suspension unit to raise the body; and
    a fourth switch means connected to said second supply means and operative to permit said supply means to supply fluid to said power chamber of said suspension unit, and
    wherein said fourth switch means is connected to said electrically controlled valve means such that when said second supply means supplies fluid to said power chamber of said suspension unit, said electrically controlled valve means will close said fluid passage.

3. A hydropneumatic suspension unit as claimed in claim 1, in which a delay means is provided whereby upon closing of said third switch means said electrically controlled valve means will be closed to close said fluid passage before said second discharge means commence to discharge fluid from said power chamber of said hydraulic suspension unit.

* * * * *